US012704958B2

(12) United States Patent
Jeong et al.

(10) Patent No.: US 12,704,958 B2
(45) Date of Patent: Aug. 11, 2026

(54) CONTROL DEVICE AND MEMORY SYSTEM FOR MANAGING STORAGE REGION EFFECTIVELY

(71) Applicant: SK hynix Inc., Icheon-si (KR)

(72) Inventors: Dong Hun Jeong, Icheon-si (KR); Young Jo Kim, Icheon-si (KR); Bo Seok Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 13 days.

(21) Appl. No.: 18/928,043

(22) Filed: Oct. 27, 2024

(65) Prior Publication Data

US 2026/0003499 A1 Jan. 1, 2026

(30) Foreign Application Priority Data

Jul. 1, 2024 (KR) ........................ 10-2024-0086033

(51) Int. Cl.
*G06F 3/06* (2006.01)

(52) U.S. Cl.
CPC .......... *G06F 3/0608* (2013.01); *G06F 3/0644* (2013.01); *G06F 3/0673* (2013.01)

(58) Field of Classification Search
CPC ..... G06F 3/0608; G06F 3/0644; G06F 3/0673
See application file for complete search history.

(56) References Cited

U.S. PATENT DOCUMENTS

2016/0253091 A1* 9/2016 Ayyavu .................... G06F 3/061
711/103
2018/0225224 A1* 8/2018 Senior ................. G06F 12/0897
2024/0036726 A1* 2/2024 Erickson ................. G06F 12/04
2024/0201894 A1* 6/2024 Erickson ............... G06F 3/0604
2024/0345949 A1* 10/2024 Liu ...................... G06F 12/0871
2025/0110670 A1* 4/2025 Erickson ............... G06F 3/0631
2025/0245141 A1* 7/2025 Rychlik .............. G06F 12/0607

FOREIGN PATENT DOCUMENTS

KR 10-2019-0074678 A 6/2019
KR 10-2020-0114483 A 10/2020

* cited by examiner

*Primary Examiner* — Edward J Dudek, Jr.

(57) ABSTRACT

Information on a free storage region may be managed by using a free storage region where compressed data is not stored among the physical storage regions storing compressed data in memory, and the movement of information on the free storage region may be managed by adding a free buffer in addition to a service queue for processing allocation and return of the physical storage region. Accordingly, it is possible to reduce the delays due to accessing a memory when allocating or returning a physical storage region, thereby improving the memory operation performance.

17 Claims, 14 Drawing Sheets

CFN X
CFN Y
CFN Z
<Memory>
Entry 0
Entry 1
Entry 2
...
Entry K
...
Entry N-3
Entry N-2
Entry N-1
<Compressed Page Table>
0xA0000000
<Device Physical Address>

110
Memory
120
122
Request Processing Unit
300
Free List Manager (Port1, CH3)
. . .
Free List Manager (Port1, CH0)
Free List Manager (Port0, CH3)
. . .
Free List Manager (Port0, CH0)
121
Service Unit
200
Host Device

FIG.7

| Service Queue Status | Free Buffer Status | Operations |
|---|---|---|
| >max_threshold | not full | Pop entry from service queue and push to free buffer |
| <min_threshold | not empty | Pop entry from free buffer and push to service queue |
| ≥min_threshold | full | Store free descriptor from free buffer into memory (Unable to access free buffer of service queue) |
| ≤max_threshold | empty | Load free descriptor from memory into free buffer (Unable to access free buffer of service queue) |
| Other cases | | Not performing any operations other than allocation/return requests. |

Data Region

CFN #0: null, null, null, null
CFN #1
CFN #2
CFN #3
CFN #4: CFN #5, CFN #6, CFN #7, CFN #8
CFN #5
CFN #6
CFN #7
CFN #8: CFN #1, CFN #9, CFN #10, CFN #0
CFN #9
CFN #10
CFN #11

| fd_head | CFN #4 |
| --- | --- |
| fd_tail | CFN #0 |

330

Free Buffer
CFN #1 → null
CFN #9 → null
CFN #10 → null
CFN #0 → null

Data Region (Data, Allocated)
Data Region (Free, Not Allocated)
Data Region (Free w/list, Free Descriptor)

Data Region

CFN #0 null null null null

CFN #1

CFN #2

CFN #3

CFN #4

CFN #5

CFN #6

CFN #7

CFN #8 CFN #1 CFN #9 CFN #10 CFN #0

CFN #9

CFN #10

CFN #11

| fd_head | CFN #8 |
| --- | --- |
| fd_tail | CFN #0 |

330

Free Buffer null → CFN #5 null → CFN #6 null → CFN #7 null → CFN #4

Data Region (Data, Allocated)

Data Region (Free, Not Allocated)

Data Region (Free w/list, Free Descriptor)

Data Region

CFN #0: CFN #2, CFN #5, CFN #11, CFN #6

CFN #1

CFN #2

CFN #3

CFN #4

CFN #5

CFN #6: CFN #1, CFN #3, CFN #4, CFN #7

CFN #7: null, null, null, null

CFN #8

CFN #9

CFN #10

CFN #11

| fd_head | CFN #0 |
| --- | --- |
| fd_tail | CFN #7 |

330

Free Buffer

CFN #1 → null

CFN #3 → null

CFN #4 → null

CFN #7 → null

Data Region (Data, Allocated)

Data Region (Free, Not Allocated)

Data Region (Free w/list, Free Descriptor)

CONTROL DEVICE AND MEMORY SYSTEM FOR MANAGING STORAGE REGION EFFECTIVELY

CROSS-REFERENCE TO RELATED APPLICATION

The present application claims priority under 35 U.S.C. § 119 (a) to Korean patent application number 10-2024-0086033 filed in the Korean Intellectual Property Office on Jul. 1, 2024, which is incorporated herein by reference in its entirety.

TECHNICAL FIELD

Embodiments of the present disclosure relate to a control device and a memory system.

BACKGROUND

A memory system may include at least one memory for storing data. A memory system may include a controller or control device for controlling at least one memory.

For example, the controller may control the operation of writing data to memory or reading data that is written to memory. In addition, in some cases, the controller may maintain or improve the operating performance of the memory, and may perform processing on data stored in the memory.

The memory system may compress and store data in order to store more data in a memory with limited capacity, and the compression of data may be performed by the above-described controller or a separate device.

SUMMARY

Embodiments of the disclosure may provide a device and system capable of compressing at least part of the data to be stored in the memory system and storing compressed data in the memory, and efficiently managing the compressed data and the region where the compressed data is stored.

Embodiments of the disclosure may provide a memory system including a memory including a plurality of compressed storage regions, each of the plurality of compressed storage regions indicated by a compressed frame number, wherein the plurality of compressed storage regions includes at least one free storage region that can be allocated, and a controller including a service queue into which a compressed frame number of a compressed storage region is loaded and a free buffer into which a compressed frame number of the at least one allocable free storage region is loaded, wherein the controller is configured to control an operation of the service queue and the free buffer and to process an allocation request and a return request for a compressed storage region.

Embodiments of the disclosure may provide a memory system including a memory including a plurality of physical storage region, each of the plurality of physical storage regions identified by a frame number, and a controller including a first buffer for processing an allocation request and a return request for the plurality of physical storage regions and a second buffer into which the frame number of an allocatable free storage region from among the plurality of physical storage regions is loaded, and configured to control an operation of the first buffer and the second buffer and to process the allocation request and the return request.

Embodiments of the disclosure may provide a control device including a service unit configured to receive and process an allocation request and a return request from a host device, and a plurality of free list managers configured to communicate with a memory device for each channel of the memory device and manage a plurality of physical storage regions included in the memory device according to the allocation request and the return request, wherein each of the plurality of free list managers further includes a free buffer for loading a frame number of at least one allocable free storage region among the plurality of physical storage regions in addition to a service queue for loading frame numbers of the plurality of physical storage regions for allocation and return according to the allocation request and the return request.

According to embodiments of the present disclosure, it is possible to increase the effective capacity of a memory system and improve the performance of a memory system by compressing and storing at least part of the data stored in the memory system and efficiently managing a region storing the compressed data.

BRIEF DESCRIPTION OF THE DRAWINGS

FIG. 7 illustrates criteria for managing data movement between a service queue and a free buffer in a free list manager according to embodiments of the present disclosure.

DETAILED DESCRIPTION

Figure 1:
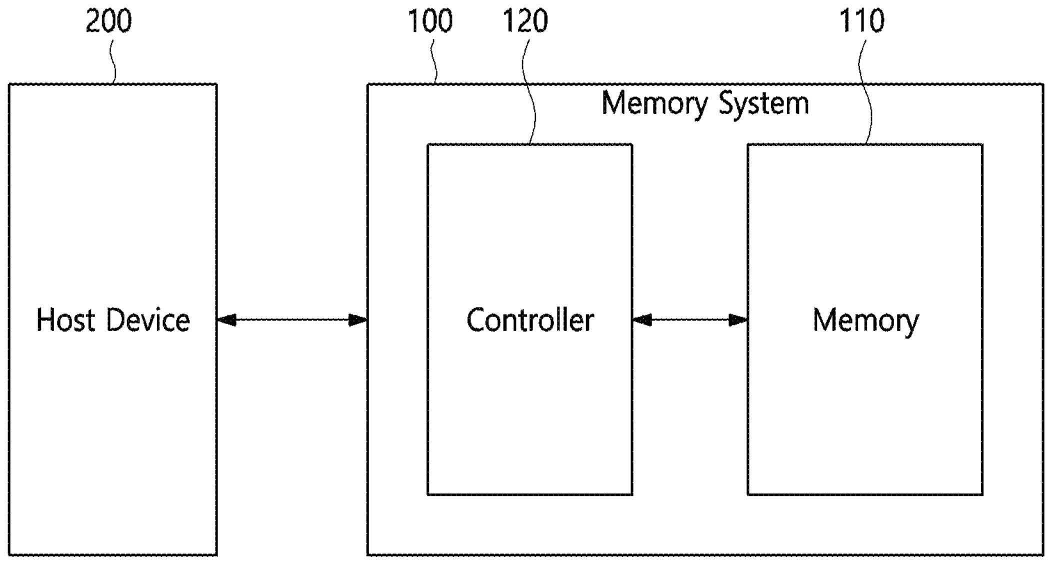
FIG. 1 schematically illustrates a memory system according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings. Further, in the following description of examples or embodiments of the present disclosure, detailed descriptions of well-known functions and components incorporated herein will be omitted when it is determined that the description may make the subject matter in some embodiments of the present disclosure more unclear. The terms such as “including”, “having”, “containing”, “constituting” “make up of”, and “formed of” used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error margin that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 schematically illustrates a memory system according to embodiments of the present disclosure.

Referring to FIG. 1, a memory system 100 may include at least one memory 110. In this specification, the memory 110 may also be referred to as a memory device. The memory system 100 may include a controller 120 that controls at least one memory 110. In this specification, the controller 120 may be referred to as a control device.

For example, the memory 110 may be a volatile memory such as DRAM, SDRAM, DDR SDRAM, or LPDDR SDRAM, but the memory 110 according to embodiments of the present disclosure is not limited thereto. The memory 110 may be a non-volatile memory such as NAND flash memory, 3D NAND flash memory, or NOR flash memory. Additionally, part of the memory 110 included in a memory system 100 may be volatile memory, and another part may be non-volatile memory.

The memory 110 may be one of various types of memory, such as a resistive RAM, a phase change memory, a magneto-resistive memory, a ferroelectric memory, or a spin injection magnetization reversal memory. Additionally, the memory 110 may, in some cases, be a processing-in-memory having an arithmetic function or a data processing function.

The controller 120 may control operations of the memory 110 based on a command received from an external device or internal commands. As an example, the controller 120 may control the operation of writing data to the memory 110 or reading data already written to the memory 110. Alternatively, the controller 120 may be disposed separately from the memory controller, which directly controls the write/read operation of the memory 110, and may perform various controls on the memory 110 or may process or manage data stored in the memory 110.

The controller 120 may communicate with a device located outside the memory system 100 and may control the operation of the memory 110. As an example, the memory system 100 may be a device that operates by communicating with an external device based on a compute express link (CXL) standard, and the controller 120 may communicate with an external device according to the CXL standard and perform the control of a memory 110. In this case, the controller 120 may be distinguished from the memory controller described above, and may be referred to as a CXL controller. Additionally, embodiments of the present disclosure may be applied to the memory system 100 that communicates with an external device according to another interface, such as PCIe, other than the CXL standard.

The controller 120 may control the operation of the memory 110 according to a command and data received from a host device 200 located outside the memory system 100.

The host device 200 may be, for example, a computer, an ultra-mobile PC (UMPC), a workstation, a personal digital assistant (PDA), a tablet, a mobile phone, a smartphone, an e-book, or a portable multimedia player (PMP), a portable game console, a navigation device, a black box, a digital camera, a digital multimedia broadcasting (DBM) players, a smart television, a digital voice recorder, a digital voice player, a digital image recorder, a digital image player, a digital video recorder, a digital video player, a storage in a data center, one of the various electronic devices constituting a home network, one of the various electronic devices constituting a telematics network, a radio frequency identification (RFID) device, a mobile device (e.g., vehicle, robot, drone) driven under human control or capable of autonomous driving, etc. Alternatively, the host device 200 may be a virtual/augmented reality device that provides two-dimensional or three-dimensional virtual reality images or augmented reality images. In addition to the examples described above, the host device 200 may be any of various electronic devices that require a memory system 100 capable of storing data for data processing.

The host device 200 may include at least one operating system. The operating system may generally manage and control the functions and operations of the host device 200 and control mutual operations between the host device 200 and the memory system 100. The operating system may be divided into a general operating system and a mobile operating system depending on the mobility of the host device 200.

The host device 200 and the controller 120 may be separate devices. In some cases, the controller 120 may be integrated with the host device 200 and implemented as a single device. In this case, the function of the controller 120 may be implemented by being included in the host device 200, and the memory system 100 may only include a memory controller that directly controls the operation of the memory 110. Hereinafter, for convenience of explanation, the controller 120 will be described as separated from the host device 200 and disposed in the memory system 100, but embodiments of the present disclosure are not limited to this example.

The memory system 100 may store data in the memory 110 according to a request from the host device 200. The memory system 100 may compress and store at least part of the data stored in the memory 110 in order to efficiently utilize the capacity of the memory 110. Data compression may be performed by the controller 120, or may be performed by a component other than the controller 120 that is disposed within the memory system 100.

The memory system 100 may divide and manage regions for storing data depending on whether the data is compressed.

Figure 2:
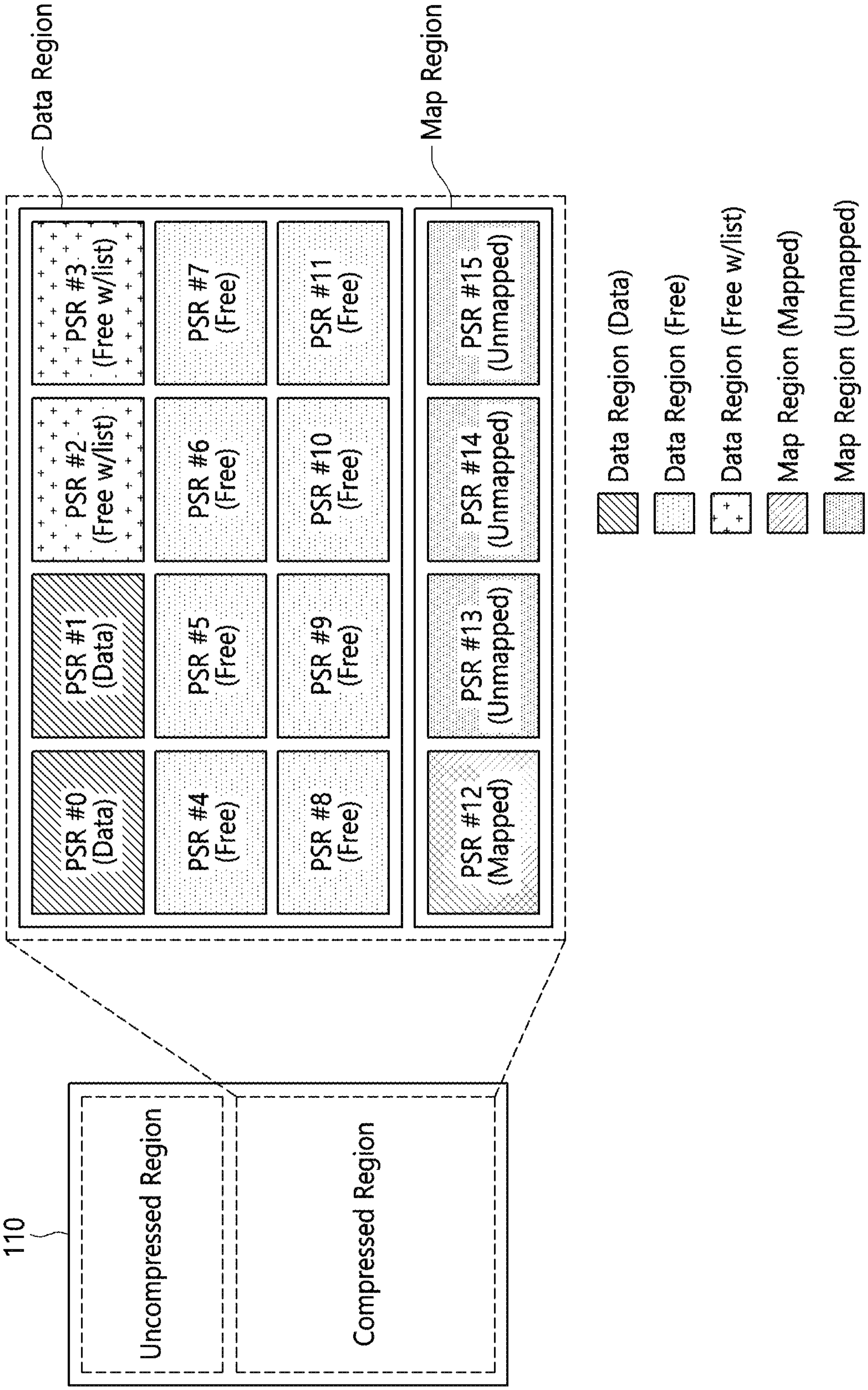
FIG. 2 illustrates an example of a storage region included in a memory according to embodiments of the present disclosure.

FIG. 2 illustrates an example of a storage region included in a memory according to embodiments of the present disclosure.

Referring to FIG. 2, a memory system 100 may compress and store at least part of the data stored in a memory 110. The memory system 100 may manage the memory 110 by distinguishing between regions where compressed data is stored and regions where uncompressed data is stored.

For example, the memory 110 may include an uncompressed region and a compressed region. The uncompressed region may be a region where uncompressed data is stored. The compressed region may be an area where compressed data is stored.

Data may be compressed by the controller 120, for example. In other embodiments, data may be compressed by a configuration or component other than the controller 120. The controller 120 may set a compression ratio based on a command received from the host device 200 and compress data according to the compression ratio. For example, the controller 120 may compress data using a compression algorithm such as LZ4, LZ4HC, ZSTD, etc., but embodiments of the present disclosure are not limited thereto.

The controller 120 may generate compressed data and store the compressed data in the compressed region of the memory 110.

For example, the compressed region may include a data region in which compressed data is stored and a map region in which mapping information for the region storing compressed data is stored. The map region may be included in the compressed region or may be located in an area other than the compressed region.

The compressed region may include a plurality of physical storage regions. Each of the plurality of physical storage regions may have a specific size. A plurality of physical storage regions may have sizes set to match compressed data. The size of a physical storage region included in the compressed region may be the same as or different from the size of a physical storage region included in the uncompressed region.

FIG. 2 illustrates an example with 16 physical storage regions PSR #0, . . . , PSR #15 included in the compressed region. Among the 16 physical storage regions PSR #0, . . . , PSR #15, 12 physical storage regions PSR #0, . . . , PSR #11 may be data regions. Among the 16 physical storage regions PSR #0, . . . , PSR #15, four physical storage regions PSR #12, . . . , PSR #15 may be map regions.

The compressed data may be stored in at least some of the physical storage regions included in the data region. The physical storage regions PSR #0 and PSR #1 may be regions where compressed data is stored. At least some of the physical storage regions included in the data region may be free storage regions in which compressed data is not stored. The physical storage regions PSR #2 to PSR #11 may be free storage regions in which the compressed data is not stored.

At least a part of the free storage region may store information about the free storage region. For example, physical storage regions PSR #2 and PSR #3 may be free storage regions that store information about the free storage region. For example, information about physical storage regions PSR #2 to PSR #11, which are free storage regions, may be stored in physical storage regions PSR #2 and PSR #3. Information about the free storage region may be managed by utilizing the free storage region included in the data region.

The map region may include a region in which mapping information is stored and a region in which mapping information is not stored.

Among the physical storage regions included in the map region, the physical storage region PSR #12 may be a region where mapping information is stored. Among the physical storage regions included in the map region, physical storage regions PSR #13 to PSR #15 may be regions in which mapping information is not stored.

For example, the mapping information stored in the physical storage region PSR #12 may be mapping information about physical storage regions PSR #0 and PSR #1 in which compressed data is stored. Since the physical storage regions PSR #0 and PSR #1 are regions where compressed data is stored, the mapping information stored in the physical storage region PSR #12 may include information mapping a logical address of the host device 200 and a mapped physical address, with a pointer indicating a physical storage region where compressed data is stored.

Figure 3:
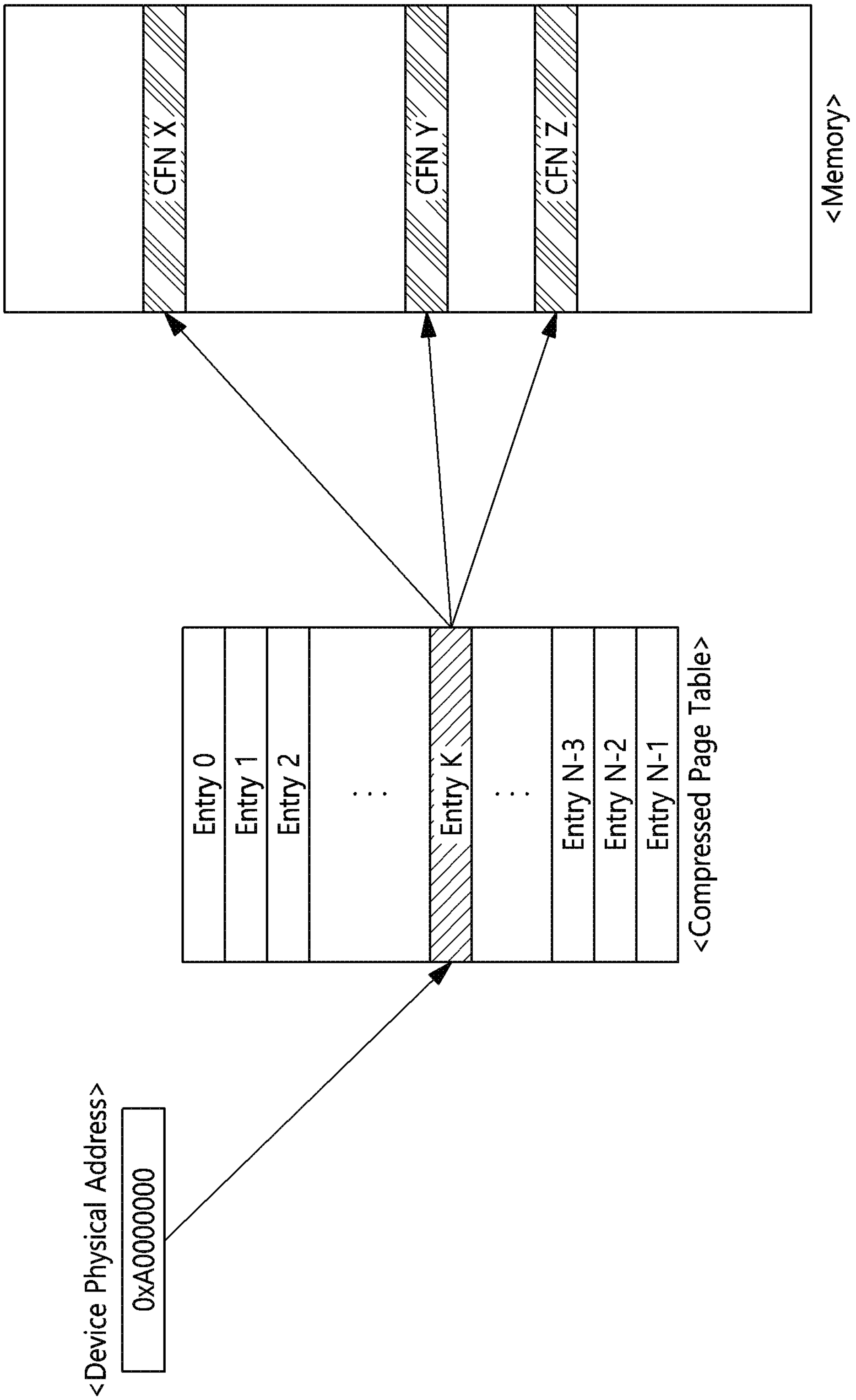
FIG. 3 illustrates an example of a mapping table indicating a region storing data in a memory according to embodiments of the present disclosure.

FIG. 3 illustrates an example of a mapping table indicating a region storing data in a memory according to embodiments of the present disclosure.

Referring to FIG. 3, a memory system 100 may map a logical address of a host device 200 and a physical address of a memory system 100. The physical address of the memory system 100 mapped to the logical address of the host device 200 may be referred to as a device physical address.

For example, the device physical address may be mapped one-to-one with the logical address of the host device 200. The device physical address of the memory system 100 may indicate at least one of the entries included in a compressed page table as illustrated in FIG. 3.

As an example, if the compressed page table includes an N number entries (N entries), entry K among the N entries may be indicated by a device physical address 0xA0000000. The compressed page table may be in the form of mapping information stored in the physical storage region PSR #12, which is a map region among the compressed regions.

The controller 120 of the memory system 100 may interpret information about entry K mapped to the device physical address in the compressed page table. The controller 120 may check the physical storage region, among the physical storage regions included in the memory 110, indicated by entry K based on the information in entry K.

The physical storage region may be indicated by, for example, a compressed frame number. In the example shown in FIG. 3, the physical storage regions, among the physical storage regions included in the memory 110, indicated by compressed frame numbers X, Y, and Z may be mapped by entry K of the compressed page table.

User data of the logical address of the host device 200 mapped to the device physical address 0xA0000000 of the memory system 100 may be compressed in the memory system 100, and may be stored in a physical storage region indicated by compressed frame numbers X, Y, and Z.

The controller 120 of the memory system 100 may compress data according to a write command from the host device 200 and update the compressed page table when storing the data. When processing a read command of the host device 200, the controller 120 may check the physical storage region where the compressed data is stored according to the compressed page table, decompress the compressed data in the physical storage region, and provide decompressed data to the host device 200.

Accordingly, the memory system 100 may manage a location of the physical storage region where the compressed data is stored using the compressed page table, and may perform operations of writing and reading the compressed data.

In addition, the memory system 100 may store information about the location of free storage regions and manage free storage regions in which no data is stored among the data regions storing compressed data.

Figure 4:
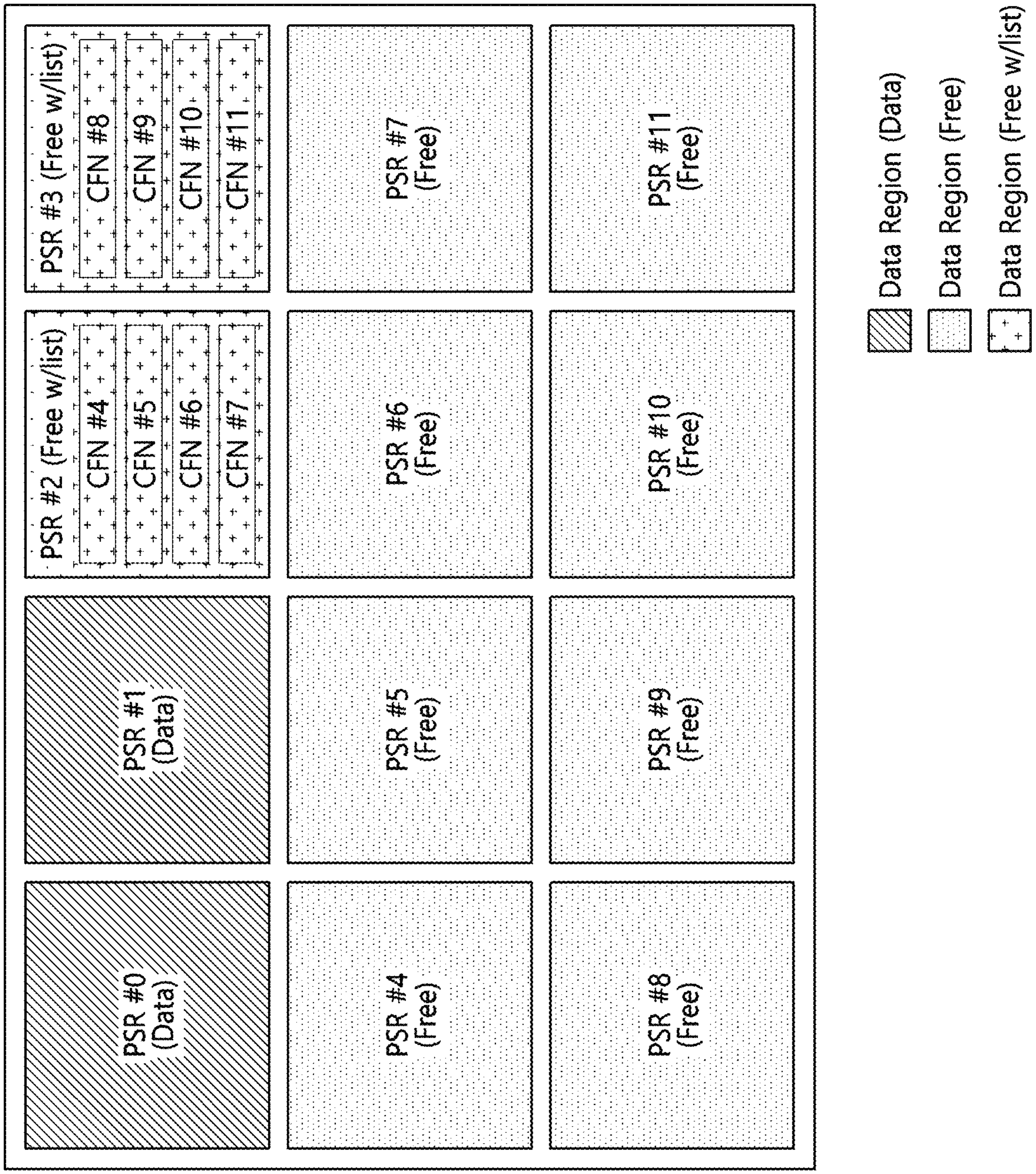
FIG. 4 illustrates an example of managing a free storage region in which no data is stored according to embodiments of the present disclosure.

FIG. 4 illustrates an example of managing a free storage region in which no data is stored according to embodiments of the present disclosure.

FIG. 4 illustrates an example in which the data region of the compressed region of the memory 110 includes 12 physical storage regions PSR #0, . . . , PSR #11. The physical storage regions PSR #0 and PSR #1 may be physical storage regions where compressed data is stored. The physical storage regions PSR #2 to PSR #11 may be physical storage regions in which compressed data is not stored, and may be free storage regions.

At least some of the free storage regions may store information about the free storage regions.

As an example, among the free storage regions, physical storage regions PSR #2 and PSR #3 may be regions storing information about the free storage regions. Among the free storage regions, physical storage regions PSR #4 to PSR #11 may be regions in which information about the free storage regions is not stored.

Information about the free storage region stored in the physical storage regions PSR #2 and PSR #3 may be stored in various forms. As an example, a compressed frame number indicating a free storage region may be stored in the physical storage regions PSR #2 and PSR #3.

The compressed frame numbers #4, #5, #6, and #7 may be stored in the physical storage region PSR #2. Information about the physical storage regions PSR #4, PSR #5, PSR #6, and PSR #7, which are free storage regions, may be stored in the physical storage region PSR #2. Similarly, compressed frame numbers #8, #9, #10, and #11 may be stored in the physical storage region PSR #3. Information about the physical storage regions PSR #8, PSR #9, PSR #10, and PSR #11, which are free storage regions, may be stored in the physical storage region PSR #3.

The example shown in FIG. 4 is only an example, and there may be various ways to store information about the free storage regions in the physical storage regions that are also free storage regions.

The controller 120 of the memory system 100 may use information, about the free storage regions, that is stored in a free storage region in which compressed data is not stored to process an allocation request for a free storage region. The controller 120 may process to return or release a physical storage region as a free storage region in response to a request for the physical storage region where compressed data can be stored.

The controller 120 may process the allocation and return of the compressed region of the memory 110 included in the memory system 100 by integrating the allocation and return, or may process the allocation and return separately for each channel of the memory 110.

Figure 5:
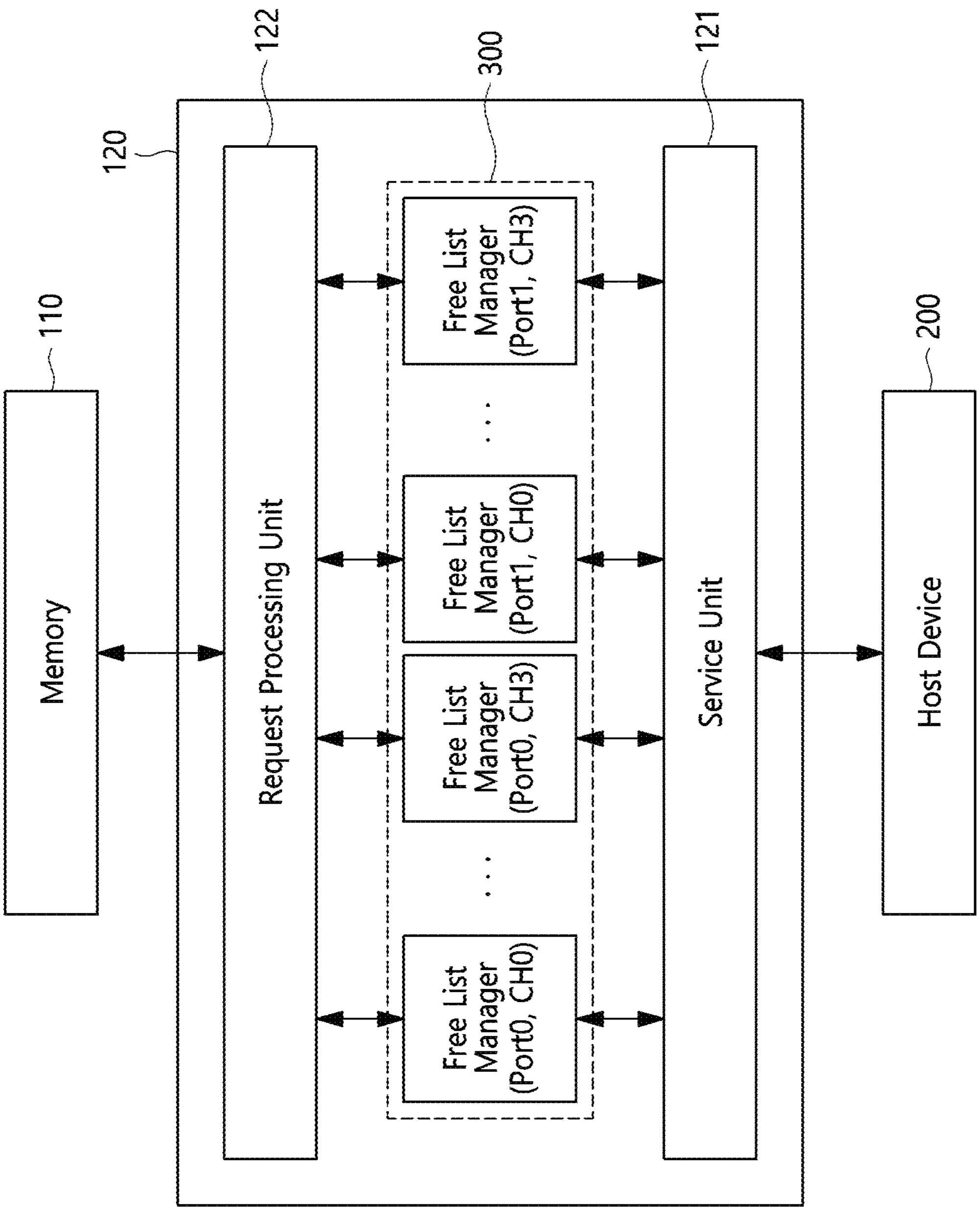
FIG. 5 illustrates a configuration of a controller according to embodiments of the present disclosure.

FIG. 5 illustrates a configuration of a controller 120 according to embodiments of the present disclosure.

Referring to FIG. 5, a controller 120 may include, for example, a service unit 121 and a request processing unit 122. The controller 120 may include at least one free list manager 300, which communicates between the service unit 121 and the request processing unit 122 and manages free storage regions included in a memory 110.

For example, the service unit 121 may communicate with a host device 200 and may receive an allocation request or a return request from the host device 200. The service unit 121 may allocate a free storage region according to an allocation request from the host device 200. The service unit 121 may process the return of the physical storage region where the compressed data is stored according to a return request from the host device 200.

The service unit 121 may process the allocation request and the return request based on information about the free storage regions provided by the free list manager 300.

The request processing unit 122 may communicate with the memory 110, and may process allocation and return of the physical storage region included in the memory 110 according to the allocation request and the return request of the host device 200.

An allocation management device in the controller 120 that performs allocation and return of a physical storage region for storing compressed data may include the service unit 121, the request processing unit 122, and the free list manager 300.

The free list manager 300 may communicate between the service unit 121 and the request processing unit 122 and manage the free storage regions, and may facilitate allocation and return of physical storage regions.

As an example, the free list manager 300 may manage the free storage region for each port of the host device 200 and each channel of the memory 110. Free storage regions managed by a plurality of free list managers 300 may be provided to the host device 200 according to an interleaving method.

Information about the free storage regions of the memory 110 may be managed by the free list manager 300 to facilitate the allocation and return of the physical storage region as requested. At least one buffer may be included for rapid allocation and return of physical storage regions.

Figure 6:
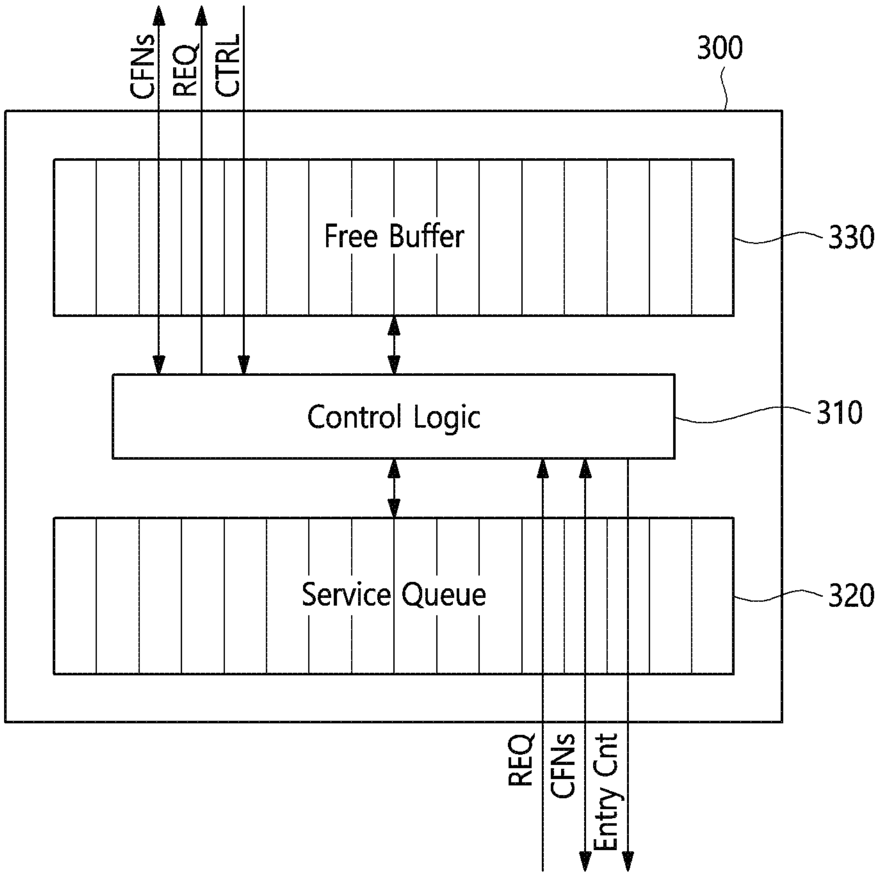
FIG. 6 illustrates a configuration of a free list manager according to embodiments of the present disclosure.

FIG. 6 illustrates a configuration of a free list manager according to embodiments of the present disclosure.

Referring to FIG. 6, a free list manager 300 may include, for example, a control logic 310, a service queue 320, and a free buffer 330.

The control logic 310 may control the overall operation of the free list manager 300. The control logic 310 may manage data loaded into the service queue 320 and the free buffer 330. The control logic 310 may control the movement of data between the service queue 320 and the free buffer 330.

The compressed frame numbers of a physical storage region for allocation may be loaded in the service queue 320. The service queue 320 may store the compressed frame number of the physical storage region for return in response to a return request from the host device 200.

The service queue 320 may load a preset number or range of compressed frame numbers. A compressed frame number loaded into the service queue 320 may indicate a free storage region included in the memory 110.

The allocation request and the return request may be received through the control logic 310, and the compressed frame number may be deleted from the service queue 320 or stored in the service queue 320 depending on the allocation request and the return request. Depending on the external request, the number of entries included in the service queue 320 may be provided.

Depending on a state of the service queue 320, at least a part of the compressed frame numbers loaded into the service queue 320 may be moved to the free buffer 330. Depending on the state of the service queue 320, at least a part of the compressed frame numbers loaded in the free buffer 330 may be moved to the service queue 320. In this specification, the service queue 320 may be referred to as a first buffer and the free buffer 330 may be referred to as a second buffer.

The movement of data (or entries) such as compressed frame numbers between the service queue 320 and the free buffer 330 may be controlled by the control logic 310.

The free buffer 330 may load a compressed frame number indicating at least one free storage region included in the memory 110. The free buffer 330 may load information, about the free storage region, that is stored in any one of the free storage regions of the memory 110. Information about part of the free storage region of the memory 110 may be loaded into the free buffer 330, and information about the remaining free storage regions of the memory 110 may be stored in the free storage regions of the memory 110.

An allocation request and a return request may be transmitted to the memory 110 by the control logic 310. The compressed frame numbers may be transferred between the memory 110 and the free buffer 330, and in some cases, the control logic 310 may receive a control signal from the memory 110.

The free buffer 330 may load compressed frame numbers for a portion of the free storage regions of the memory 110, thereby reducing delay from accessing the memory 110 when allocating a compressed frame number.

The size of the free buffer 330 is not limited, but may be larger than the size of the service queue 320 for smoother operation of the service queue 320. There may be only one free buffer 330, or in some cases, two or more free buffers 330 may be included in the free list manager 300. With two or more free buffers 330, the free buffer 330 may be divided into a free buffer 330 for exchanging data with the service queue 320 and a free buffer 330 exchanging data with the memory 110.

The free buffer 330 may have the same size as the size of the physical storage region in the memory 110 where information about the free storage region is stored. For example, if compressed frame numbers of four free storage regions can be stored in a free storage region of the memory 110, the free buffer 330 may have a size capable of storing four compressed frame numbers. In some embodiments, the size of the free buffer 330 may be M (where M is an integer greater than or equal to 1) times the size of the free storage region included in the memory 110.

The free list manager 300 may control data movement between the service queue 320 and the free buffer 330, and allow the controller 120 to efficiently process the allocation request and the return request for the physical storage region.

The control logic 310 of the free list manager 300 may control the movement of data between the service queue 320 and the free buffer 330, or the movement of data between the free buffer 330 and the memory 110, according to various criteria, thereby increasing the efficiency of allocation and return processing of compressed frame numbers indicating physical storage regions.

FIG. 7 illustrates criteria for managing data movement between a service queue and a free buffer in a free list manager according to embodiments of the present disclosure.

Referring to FIG. 7, a free list manager 300 may control the movement of data between a service queue 320 and a free buffer 330 based on at least one of the state of the service queue 320 and the state of the free buffer 330. The free list manager 300 may control data movement between the free buffer 330 and the memory 110 based on at least one of the state of the service queue 320 and the state of the free buffer 330.

Data (or entries) moved between the service queue 320 and the free buffer 330, or between the free buffer 330 and the memory 110, may be a compressed frame number indicating a physical storage region of the memory 110.

The free list manager 300 may control data movement depending on whether the number of compressed frame numbers loaded into the service queue 320 exceeds a first threshold. The first threshold may be, for example, a preset upper limit threshold and may be a max_threshold as described in FIG. 7.

If the number of compressed frame numbers loaded in the service queue 320 exceeds the first threshold, and the free buffer 330 is not full, then the free list manager 300 may move at least a portion of the compressed frame numbers loaded into the service queue 320 to the free buffer 330.

A full state of the free buffer 330 may mean a state in which the number of compressed frame numbers loaded into free buffer 330 corresponds to the capacity of the free buffer 330. If the free buffer 330 is not full, then the free list manager 300 may move a compressed frame number loaded in the service queue 320 to the free buffer 330, and then manage the number of compressed frame numbers loaded into the service queue 320 to be less than or equal to the first threshold value.

If the number of compressed frame numbers loaded in the service queue 320 is less than or equal to the first threshold and the free buffer 330 is empty, then the free list manager 300 may load at least a part of the compressed frame numbers stored in the free storage region of the memory 110 into the free buffer 330. In this state, data movement between the service queue 320 and the free buffer 330 is not performed.

The empty state of the free buffer 330 may mean that compressed frame numbers are not loaded into the free buffer 330. Since compressed frame numbers below the first threshold are loaded in the service queue 320, the free list manager 300 may reduce delay time when allocating compressed frame numbers by pre-loading the compressed frame numbers stored in the free storage region of the memory 110 into the free buffer 330.

The free list manager 300 may control data movement depending on whether the number of compressed frame numbers loaded into the service queue 320 is less than a second threshold. The second threshold may be, for example, a preset lower limit threshold and may be a min_threshold described in FIG. 7.

If the number of compressed frame numbers loaded in the service queue 320 is less than the second threshold and the free buffer 330 is not empty, then the free list manager 300 may move at least part of the compressed frame numbers loaded in the free buffer 330 to the service queue 320.

If the number of compressed frame numbers loaded in the service queue 320 is less than a specific number, then the free list manager 300 may more quickly process the allocation request by moving a compressed frame number loaded in the free buffer 330 to the service queue 320, and may manage the service queue 320 without affecting the processing of the return request.

If the number of compressed frame numbers loaded in the service queue 320 is greater than or equal to the second threshold and the free buffer 330 is full, then the free list manager 300 may store at least a portion of the compressed frame numbers loaded in the free buffer 330 in the free storage region of the memory 110. In this state, data movement between the service queue 320 and the free buffer 330 is not performed.

Since the number of compressed frame numbers loaded in the service queue 320 is more than the second threshold, the free list manager 300 may empty the free buffer 330 and manage the compressed frame numbers in the free storage region through the free storage region of the memory 110. Additionally, the free list manager 300 may maintain the number of compressed frame numbers loaded in the service queue 320 at a constant level and may more quickly process the return request for the compressed frame number.

When the number of compressed frame numbers loaded into the service queue 320 is greater than or equal to the second threshold and less than or equal to the first threshold, and the free buffer 330 is not full or not empty, the free list manager 300 does not transfer compressed frame numbers between the free buffer 330 and the memory 110.

If the number of compressed frame numbers loaded in the service queue 320 is greater than or equal to the second threshold and less than or equal to the first threshold, the free list manager 300 does not transfer compressed frame numbers between the service queue 320 and the free buffer 330.

In addition to the examples described above, the free list manager 300 may manage the compressed frame numbers loaded into the free buffer 330 in various ways based on the state of the service queue 320 and the state of the free buffer 330. As an example, the free list manager 300 may control data movement between the service queue 320 and the free buffer 330 based on the size of the service queue 320, the size of the free buffer 330, or the number of free buffers 330.

According to embodiments of the present disclosure, information about the free storage regions may be managed through the free storage regions of the memory 110 by effectively using the free buffer 330 included in the free list manager 300 in a manner that reduces delays due to the allocation and return of free storage regions.

FIGS. 8A to 8G illustrate examples of methods for managing information about a free storage region by a free list manager according to embodiments of the present disclosure.

Figure 8A:
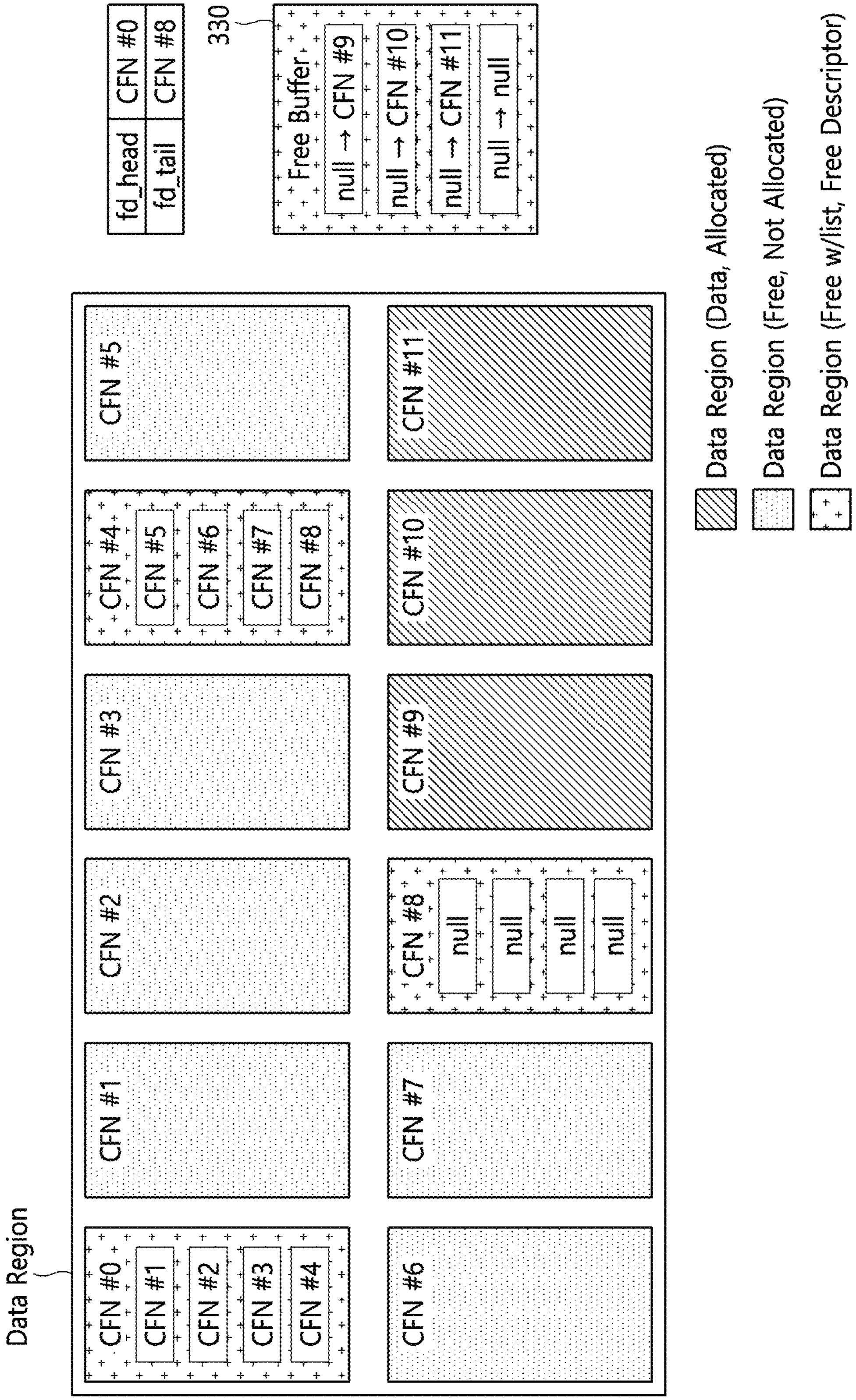
FIGS. 8A to 8G illustrate examples of methods for managing information about a free storage region by a free list manager according to embodiments of the present disclosure.

Referring to FIG. 8A, 12 physical storage regions included in the data region are shown by way of example, and each physical storage region is indicated by compressed frame numbers (CFN) #0 to #11.

In an initialization state, all 12 physical storage regions included in the data region may be free storage regions in which no compressed data is stored. The controller 120 may store information about the free storage regions within some of the free storage regions. Information about a free storage region may be a compressed frame number for a free storage region.

As an example, compressed frame numbers #1, #2, #3, and #4 may be stored in the free storage region indicated by compressed frame number #0. A free storage region storing compressed frame numbers may be referred to as a free descriptor, and a free buffer 330 may be referred to as a free descriptor buffer.

The controller 120 may manage a free descriptor head field, and the free descriptor head field may indicate the compressed frame number (e.g., #0) of the physical storage region that stores compressed frame numbers (e.g., #1, #2, #3, and #4). The compressed frame number of another free storage region (such as for example, a free storage region indicated by compressed frame number #4) may be stored in the free storage region identified by compressed frame number #0 in the free descriptor head field. In this way, the free descriptor storing the compressed frame numbers of other free storages region may be managed in the form of a linked list.

The compressed frame numbers #5, #6, #7, and #8 may be stored in the free storage region indicated by compressed frame number #4. The free storage region identified by compressed frame #8, from among the free storage regions, may be indicated by the last compressed frame number #8 stored in the free storage region identified by compressed frame number #4. The controller 120 may indicate the free storage region indicated by compressed frame number #8 using a free descriptor tail field.

Since the free buffer 330 is empty, the controller 120 may load the compressed frame numbers of at least some of the free storage regions included in the data region into the free buffer 330. As an example, the controller 120 may load compressed frames #9, #10, and #11 into the free buffer 330.

If the free buffer 330 has the same size as a free storage region, then in FIG. 8A four compressed frame numbers may be loaded into the free buffer 330. If compressed frame numbers #9, #10, and #11 are loaded into the free buffer 330, then the remaining or last area of the free buffer 330 may have a null value.

The controller 120 may manage the free storage region indicated by compressed frame numbers #9, #10, and #11 loaded in the free buffer 330 as a reserved allocation region. In a state in which compressed frame numbers #9, #10, and #11 are loaded in the free buffer 330, data in the free buffer 330 may be moved to the service queue 320 depending on the state of the service queue 320, and a compressed frame number loaded into the free buffer 330 may be allocated according to an allocation request from the host device 200. When allocating a compressed frame number, the compressed frame number may be quickly allocated through the free buffer 330 and service queue 320 of the free list manager 300 without accessing the free storage region of the memory 110.

If a compressed frame number is allocated according to an allocation request for a compressed frame number (i.e., if a free storage region is allocated), then the controller 120 may update the compressed frame numbers loaded into the free buffer 330. The controller 120 may control data movement between the free buffer 330 and the service queue 320 according to the states of the free buffer 330 and the service queue 320.

Figure 8B:
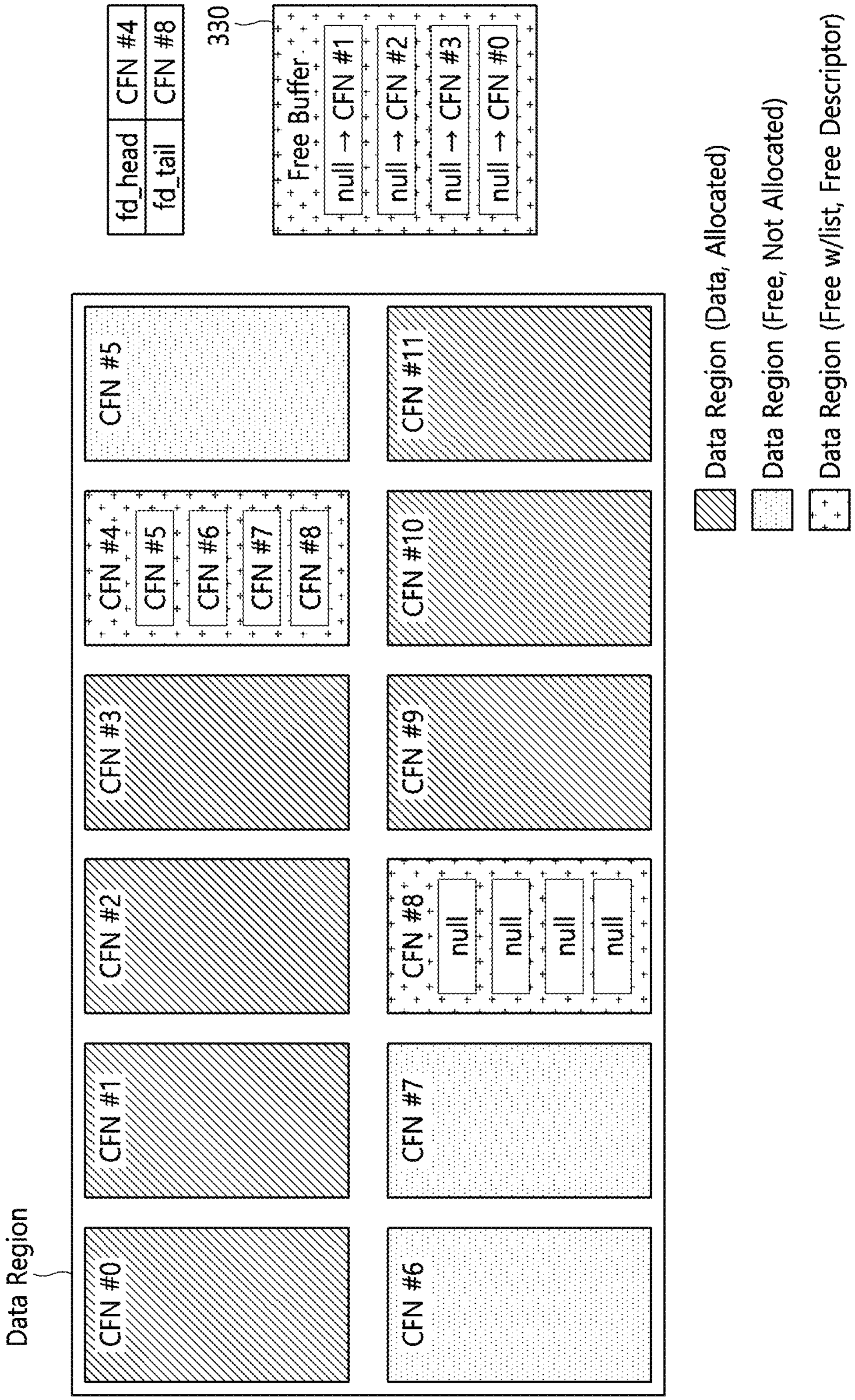

As an example, referring to FIG. 8B, after the initialization state shown in FIG. 8A, the free storage region indicated by compressed frame numbers #9, #10, and #11 may be allocated according to an allocation request, after which the free buffer 330 may be empty. Therefore, some of the compressed frame numbers stored in the free storage region may be loaded into the free buffer 330.

For example, in the state shown in FIG. 8B, the controller 120 may load compressed frame numbers #1, #2, and #3, stored in the free storage region that is indicated by compressed frame number #0, into the free buffer 330. The controller 120 may load compressed frame numbers #1, #2, and #3 into the free buffer 330, then may load compressed frame number #0 into the free buffer 330, and then may update the free descriptor head field to indicate compressed frame number #4.

In the memory 110, the compressed frame number of the free storage region may be managed by a free storage region indicated by compressed frame numbers #4 and #8 from among the free storage regions. The compressed frame numbers of the remaining free storage regions may be loaded into the free buffer 330, and the free storage regions indicated by the corresponding compressed frame numbers may be managed as reserved allocation regions.

The controller 120 may allocate a free storage region indicated by compressed frame numbers #1, #2, #3, and #0 loaded into the free buffer 330 in response to an allocation request. The allocation of compressed frame numbers of the free storage region may be performed through the free buffer 330 without involving the memory 110.

In addition, the controller 120 may store at least a part of the compressed frame numbers loaded in the free buffer 330 into a part of the free storage regions of the memory 110 according to the state of the service queue 320 and the return request.

Figure 8C:
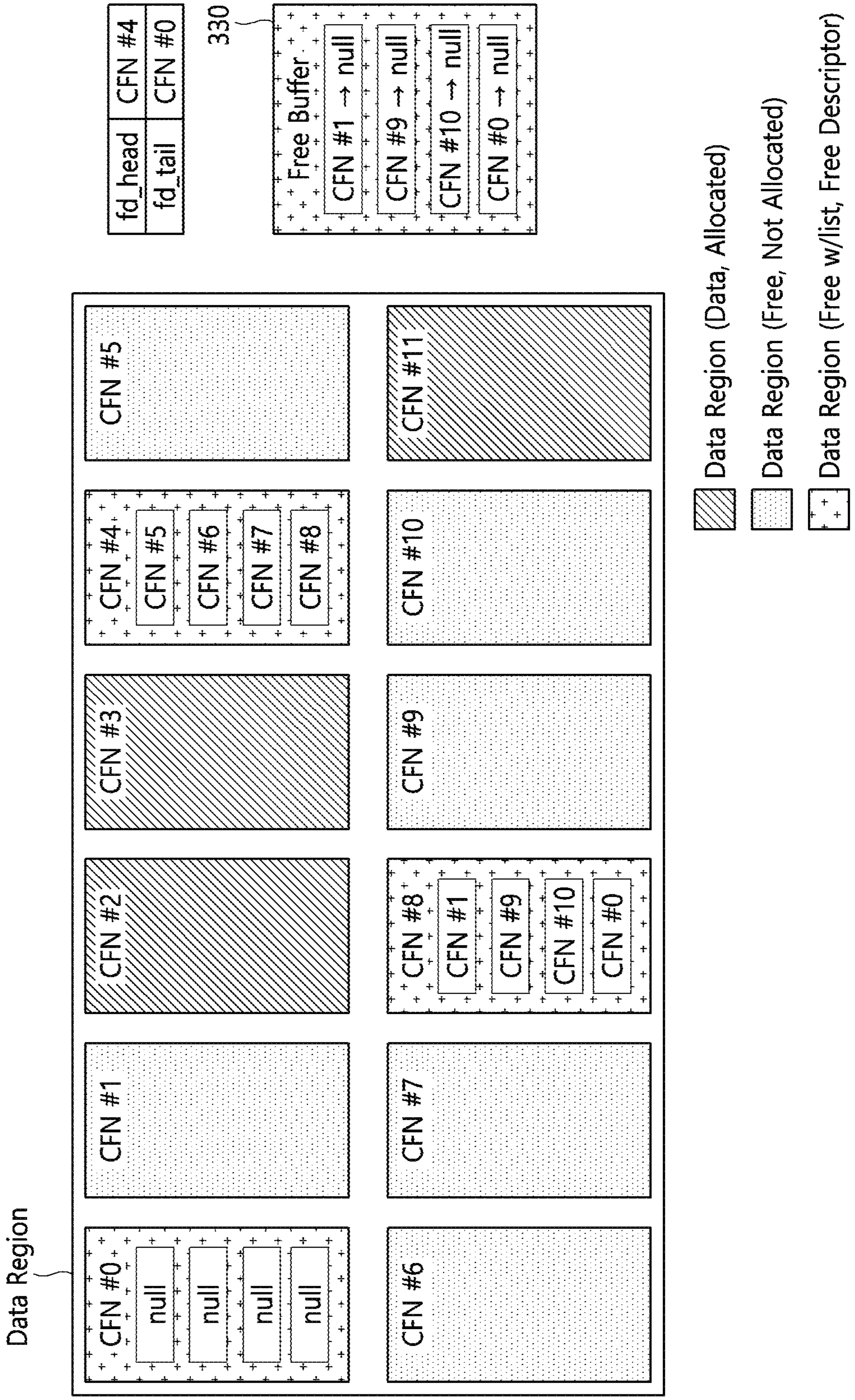

For example, FIG. 8C illustrates a process in which a physical storage region allocated in the state shown in FIG. 8B and indicated by compressed frame numbers #0, #1, #9, and #10 is returned.

The controller 120 may manage the returned compressed frame numbers #0, #1, #9, and #10 through the free buffer 330. In addition, the controller 120 may store compressed frame numbers #0, #1, #9, and #10 loaded in the free buffer 330 in one of the free storage regions of the memory 110 depending on the state of the service queue 320, etc.

As an example, the controller 120 may store compressed frame numbers #0, #1, and #9 in the free storage region corresponding to compressed frame number #8 indicated by the free descriptor tail field in the state shown in FIG. 8B. The controller 120 may sequentially store compressed frame numbers #1, #9, #10, and #0 in the free storage region, and may update the free buffer 330 with a null value.

The controller 120 may change the free storage region indicated by the compressed frame number #0, which was last stored in the free storage region corresponding to compressed frame number #8, to a free descriptor, and may update the compressed frame number indicated by the free descriptor tail field to #0.

Thereafter, the controller 120 may repeatedly perform at least part of the above-described processes depending on the allocation request and the return request for the compressed frame number, the state of the service queue 320, and the state of the free buffer 330.

Figure 8D:
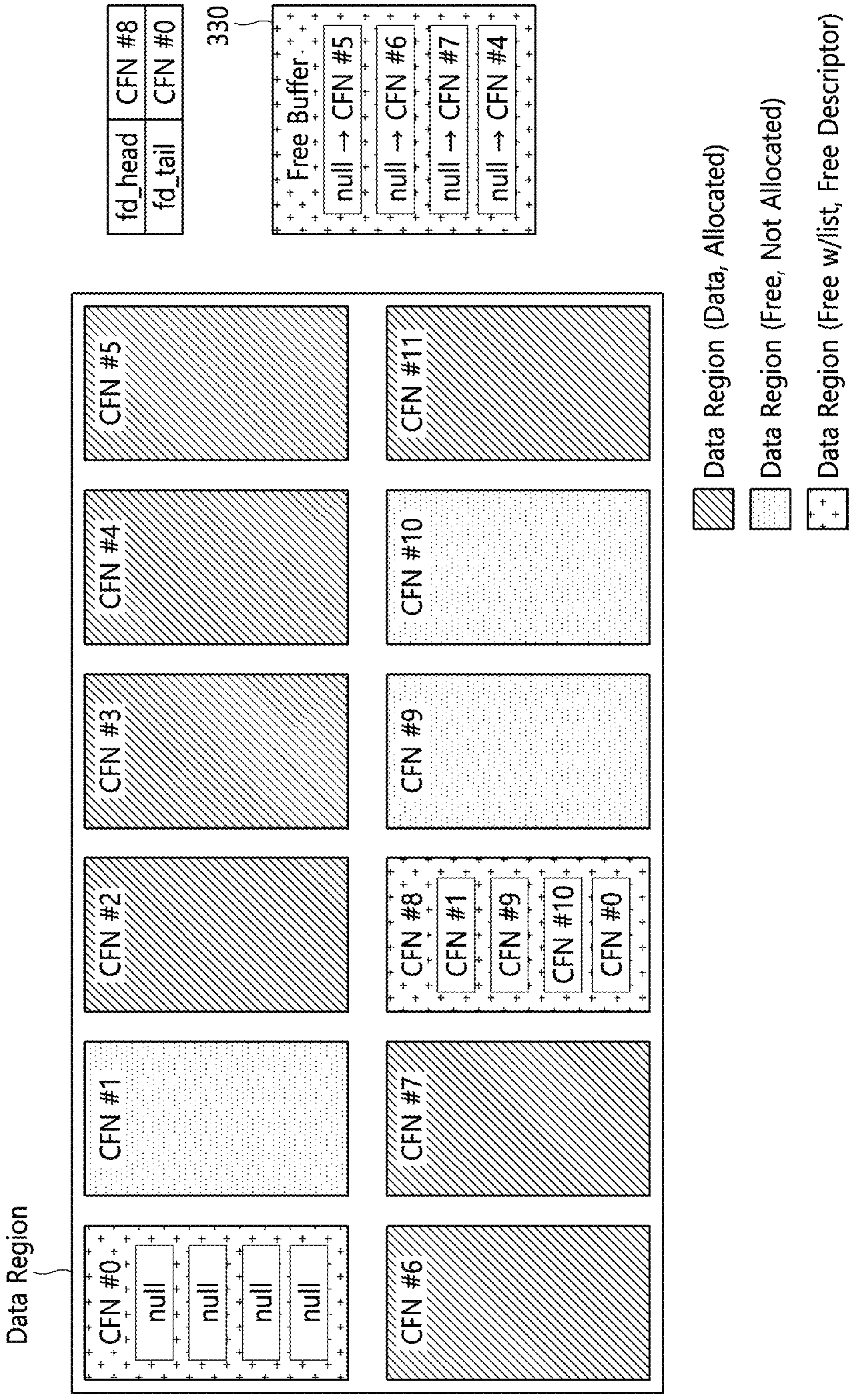

As an example, referring to FIG. 8D, the controller 120 may load, in the state shown in FIG. 8C, compressed frame numbers #5, #6, and #7 stored in the free storage region corresponding to compressed frame number #4 into the free buffer 330. The controller 120 may load compressed frame number #4 into the free buffer 330, and update a value indicated by the free descriptor head field to compressed frame number #8.

The free storage region corresponding to the compressed frame number loaded into the free buffer 330 may be managed as a reserved allocation region, and the compressed frame number of the free storage region in the memory 110 may be managed by the free storage region indicated by compressed frame numbers #8 and #0 from among the free storage regions.

Figure 8E:
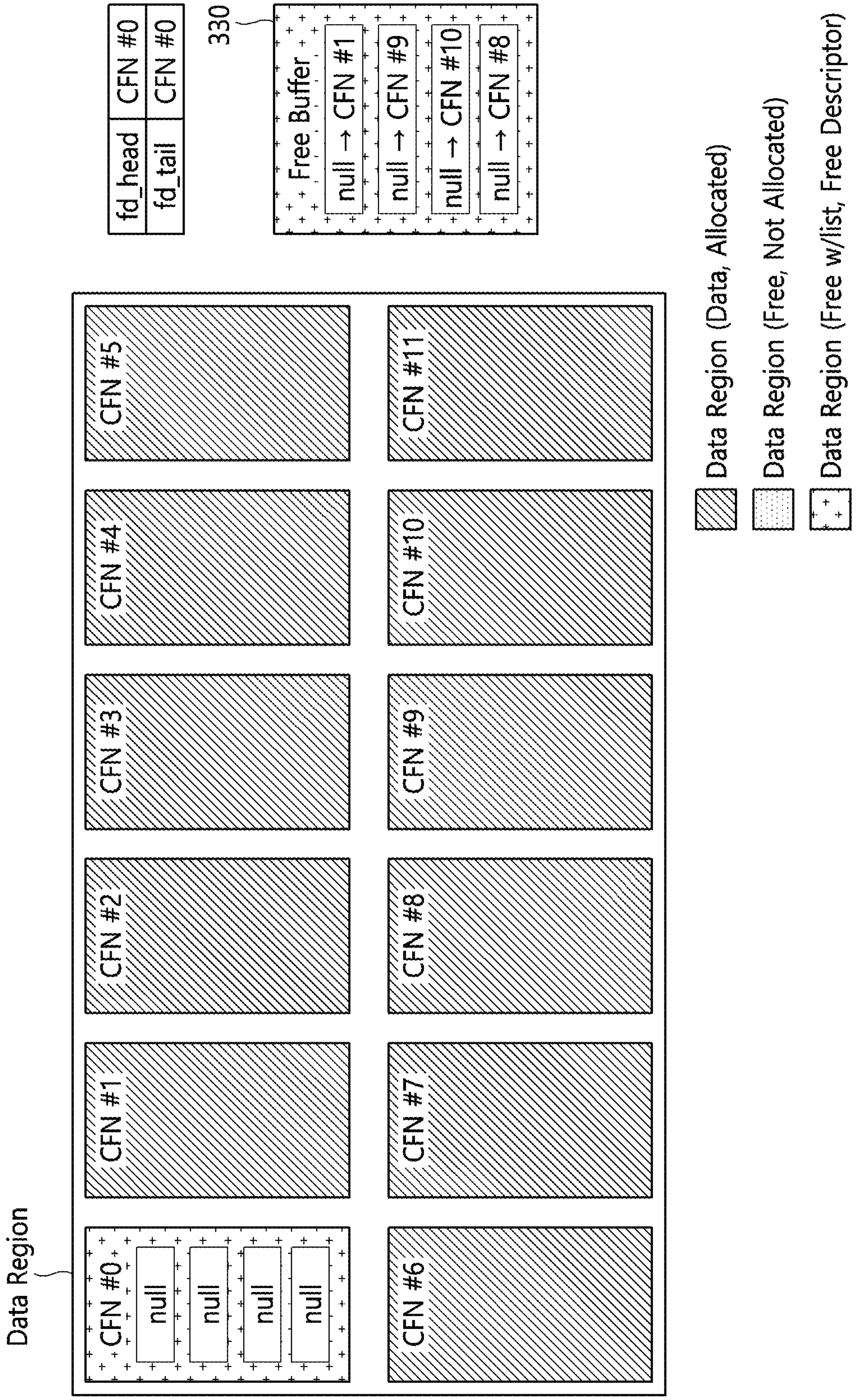

Referring to FIG. 8E, the controller 120 may load compressed frame numbers #1, #9, and #10 stored in the free storage region indicated by compressed frame number #8 from FIG. 8D into the free buffer 330. The controller 120 may load compressed frame number #8 into the free buffer 330, and may update the compressed frame number indicated by the free descriptor head field into #0.

Only the physical storage region indicated by compressed frame number #0 may be managed as a free storage region.

Figure 8F:
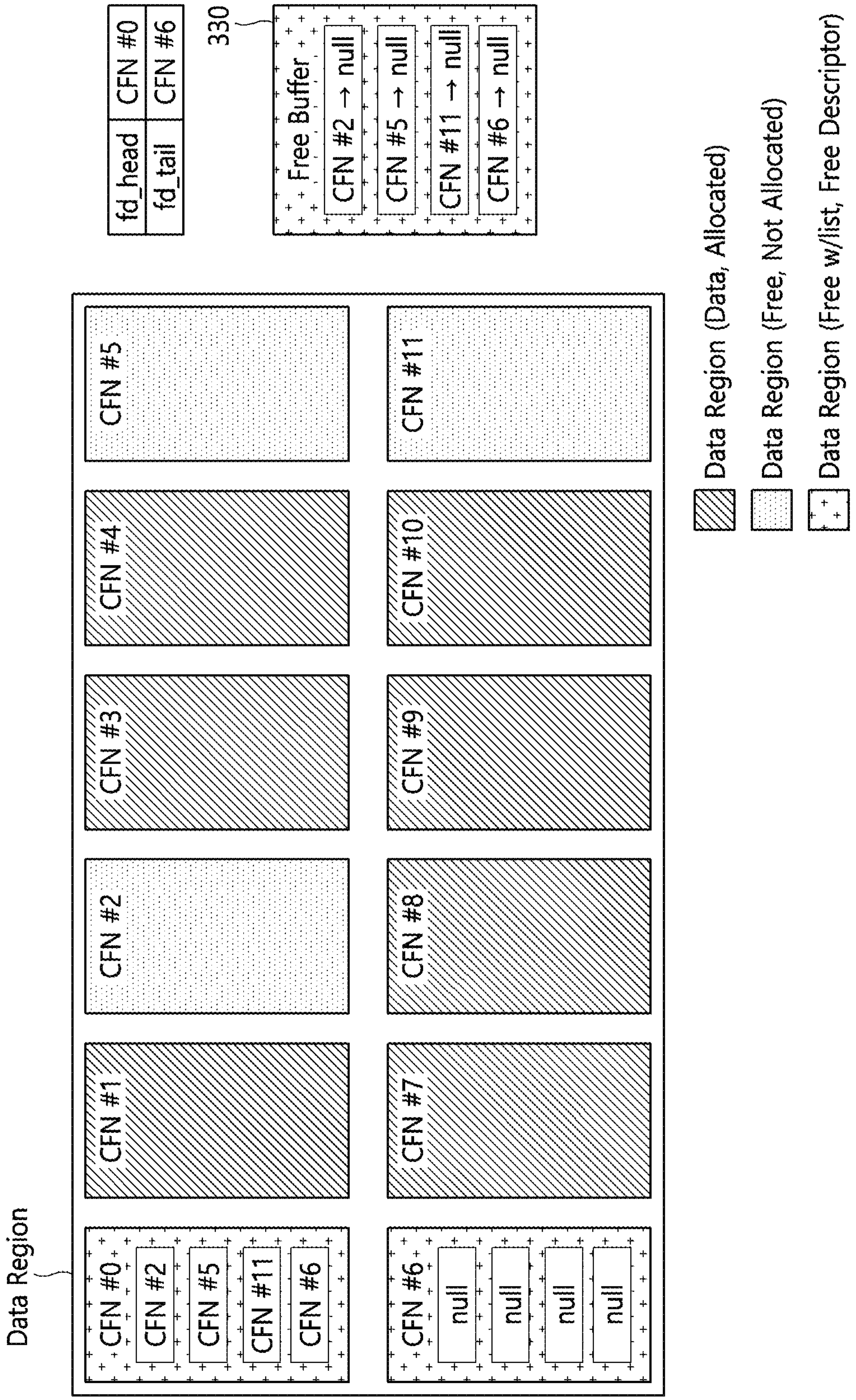

Referring to FIG. 8F, the controller 120 may store at least a part of the compressed frame numbers loaded in the free buffer 330 back into the free storage region of the memory 110 in response to the return request of the compressed frame number. For example, the controller 120 may sequentially store compressed frame numbers #2, #5, #11, and #6 in the free buffer 330 into the free storage region indicated by compressed frame number #0 of the memory 110.

The controller 120 may set a free storage region corresponding to compressed frame number #6, which is last stored in the free storage region corresponding to compressed frame number #0, as a free descriptor, and may update a free descriptor tail field with compressed frame number #6.

Figure 8G:
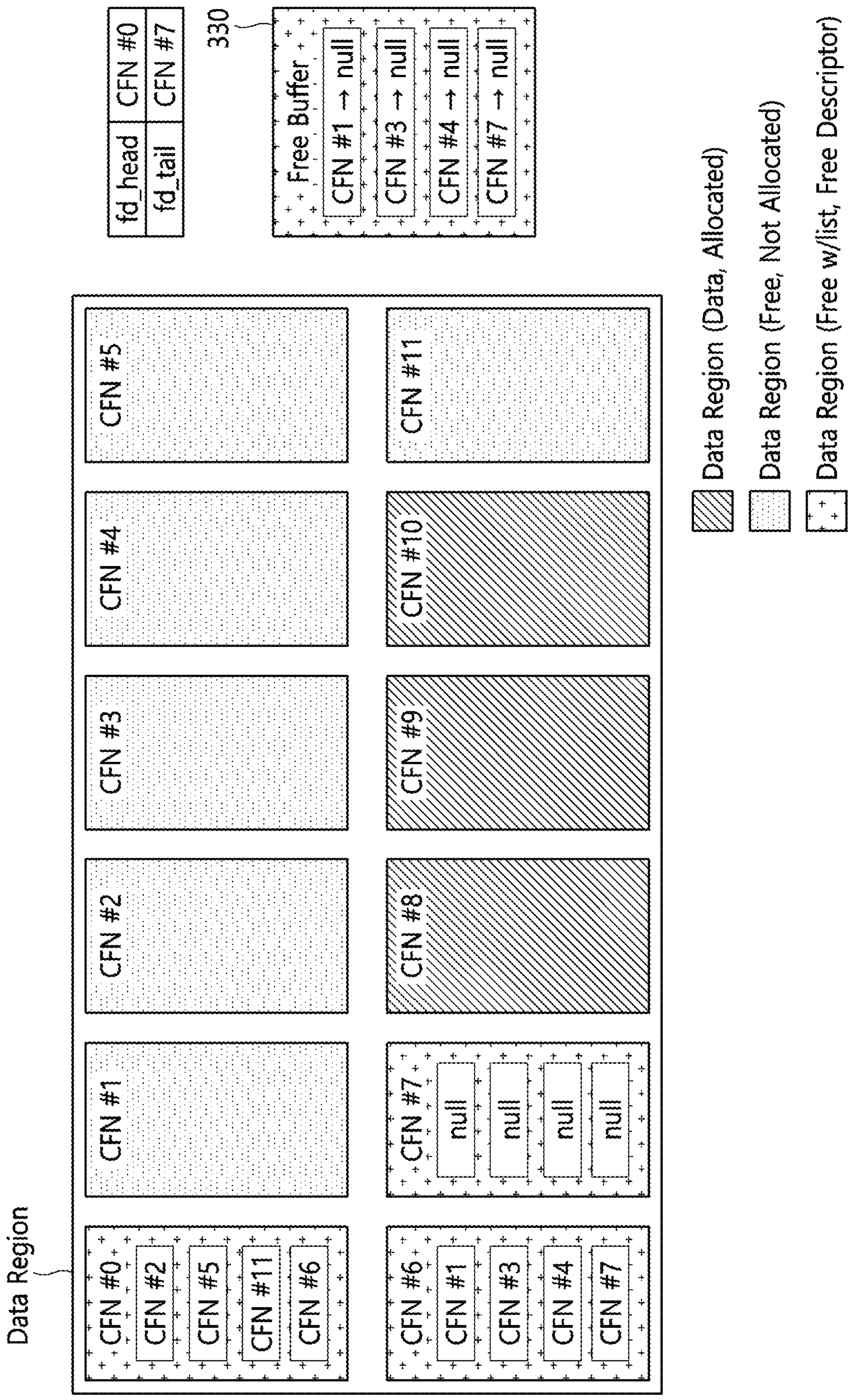

Referring to FIG. 8G, if an additional return of the compressed frame number occurs, then the controller 120 may store the compressed frame numbers #1, #3, #4, and #7 of the free buffer 330 into the free storage region corresponding to compressed frame number #6 indicated by the free descriptor tail field in FIG. 8F.

The controller 120 may update compressed frame number #7, which is last stored in the free storage region corresponding to compressed frame number #6, to a value indicated by the free descriptor tail field. The free buffer 330 may be empty, and the free storage region of the memory 110 may be managed by the free storage regions indicated by compressed frame numbers #0, #6, and #7.

As in the above-mentioned examples, embodiments of the present disclosure may manage compressed frame numbers indicating free storage regions included in the memory 110 using some of the free storage regions, thereby efficiently utilizing a region for storing data. The storage efficiency of the memory 110 may be increased through the storage of compressed data, and no additional capacity for managing information about the free storage region is required, thereby efficiently utilizing the memory 110.

In addition, the free list manager 300, which manages the allocation and return of compressed frame numbers indicating the free storage region or allocated physical storage region, may manage a part of the compressed frame number of the free storage region in the memory 110 through the free buffer 330 in addition to the service queue 320. Therefore, the allocation and return of compressed frame numbers may be performed while reducing delays due to the need to access to the memory 110 when processing the allocation request and the return request for compressed frame numbers.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:

a memory including a plurality of compressed storage regions, each of the plurality of compressed storage regions indicated by a compressed frame number, wherein the plurality of compressed storage regions includes at least one free storage region that can be allocated; and a controller including a service queue into which a compressed frame number of a compressed storage region is loaded and a free buffer into which a compressed frame number of the at least one free storage region is loaded, wherein the controller is configured to control an operation of the service queue and the free buffer and to process an allocation request and a return request for the plurality of compressed storage regions, and wherein, when a number of compressed frame numbers loaded in the service queue exceeds a first threshold and the free buffer is not full, the controller moves at least one of the compressed frame numbers loaded in the service queue to the free buffer.

2. The memory system of claim 1, wherein, when a number of compressed frame numbers loaded in the service queue is less than or equal to thea first threshold and the free buffer is empty, the controller loads at least one of the compressed frame numbers that is stored in the memory and that indicates the free storage region into the free buffer.

3. The memory system of claim 1, wherein, when a number of compressed frame numbers loaded into the service queue is less than a second threshold and the free buffer is not empty, the controller moves at least one of the compressed frame numbers loaded in the free buffer to the service queue.

4. The memory system of claim 1, wherein, when a number of compressed frame numbers loaded into the service queue is greater than or equal to a second threshold and the free buffer is full, the controller stores at least one of the compressed frame numbers loaded in the free buffer into the memory.

5. The memory system of claim 1, wherein, when a number of compressed frame numbers loaded into the service queue is greater than or equal to a preset lower limit and less than or equal to a preset upper limit, and the free buffer is not full or empty, the controller does not move the compressed frame numbers that indicate the free storage region between the free buffer and the memory.

6. The memory system of claim 1, wherein, when a number of compressed frame numbers loaded into the service queue is greater than or equal to a preset lower limit and less than or equal to a preset upper limit, the controller does not move the compressed frame numbers between the free buffer and the memory.

7. The memory system of claim 1, wherein, when at least part of the free buffer is empty, the controller loads at least one of compressed frame numbers that is stored in the memory and that indicates the free storage region into the free buffer, and manages the free storage region indicated by the at least one of the compressed frame numbers loaded in the free buffer as a reserved allocation region.

8. The memory system of claim 1, wherein a size of the free buffer is M (where M is an integer equal to or greater than 1) times a size of each of the plurality of compressed storage regions.

9. The memory system of claim 1, wherein at least one of the plurality of compressed storage regions stores at least one of compressed frame numbers that indicates the free storage region.

10. The memory system of claim 1, wherein the controller loads the compressed frame number stored in the free storage region into the free buffer.

11. The memory system of claim 1, wherein a size of the free buffer is greater than or equal to a size of the service queue.

12. The memory system of claim 1, wherein the controller provides the compressed frame number loaded into the service queue and performs allocation of a compressed storage region when receiving the allocation request, and stores the compressed frame number as a target of the return request into the service queue and processes a return of the compressed storage region when receiving the return request.

13. A memory system comprising:

a memory including a plurality of physical storage regions, each of the plurality of physical storage regions being identified by a frame number; and a controller including a first buffer for processing an allocation request and a return request for the plurality of physical storage regions and a second buffer into which the frame number of a free storage region from among the plurality of physical storage regions is loaded, and configured to control an operation of the first buffer and the second buffer and to process the allocation request and the return request, wherein, if a number of frame numbers loaded into the first buffer exceeds a first threshold or is less than a second threshold, the controller moves the frame numbers between the first buffer and the second buffer depending on a state of the second buffer.

14. The memory system of claim 13, wherein, if a number of frame numbers loaded into the first buffer is less than or equal to the first threshold and greater than or equal to the second threshold, the controller moves the frame numbers between the second buffer and the memory depending on a state of the second buffer.

15. The memory system of claim 13, wherein the controller manages by storing frame numbers of a portion of the free storage region into the second buffer and storing frame numbers of remainder of the free storage region into the memory.

16. The memory system of claim 15, wherein a number of frame numbers stored in the second buffer is equal to a number of frame numbers stored in at least one of the plurality of physical storage regions of the memory.

17. A control device comprising:

a controller configured to receive and process an allocation request and a return request from a host device; and a plurality of free list managers configured to communicate with a memory device for each channel of the memory device and to manage a plurality of physical storage regions included in the memory device according to the allocation request and the return request, wherein each of the plurality of free list managers further includes a free buffer for loading a frame number of at least one allocable free storage region among the plurality of physical storage regions and a service queue for loading frame numbers of the plurality of physical storage regions for allocation and return according to the allocation request and the return request, wherein each of the plurality of free list managers moves a frame number loaded in the free buffer between the free buffer and the service queue or between the free buffer and the memory device depending on a state of the service queue.

* * * * *